US012772289B2

(12) United States Patent
Dong

(10) Patent No.: US 12,772,289 B2
(45) Date of Patent: Oct. 20, 2026

(54) COMMUNICATION METHODS AND COMMUNICATION APPARATUSES

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 417 days.

(21) Appl. No.: 18/565,159

(22) PCT Filed: Jun. 7, 2021

(86) PCT No.: PCT/CN2021/098696
§ 371 (c)(1),
(2) Date: Nov. 29, 2023

(87) PCT Pub. No.: WO2022/256985
PCT Pub. Date: Dec. 15, 2022

(65) Prior Publication Data

US 2024/0334484 A1 Oct. 3, 2024

(51) Int. Cl.

| | |
|---|---|
| ***H04W 74/0816*** | (2024.01) |
| ***H04W 8/22*** | (2009.01) |
| ***H04W 74/00*** | (2009.01) |

(52) U.S. Cl.
CPC ......... *H04W 74/0816* (2013.01); *H04W 8/22* (2013.01); *H04W 74/002* (2013.01)

(58) Field of Classification Search
None
See application file for complete search history.

(56) References Cited

U.S. PATENT DOCUMENTS

| | | | |
|---|---|---|---|
| 10,938,644 | B2 | 3/2021 | Xiao et al. |
| 2019/0268221 | A1 | 8/2019 | Xiao et al. |
| 2019/0268956 | A1 | 8/2019 | Xiao et al. |
| 2020/0213933 | A1 | 7/2020 | Raissinia et al. |
| 2021/0007168 | A1 | 1/2021 | Asterjadhi et al. |

(Continued)

FOREIGN PATENT DOCUMENTS

| | | | |
|---|---|---|---|
| CN | 103533578 | A | 1/2014 |
| CN | 111788849 | A | 10/2020 |

(Continued)

OTHER PUBLICATIONS

ISA State Intellectual Property Office of the People's Republic of China, International Search Report Issued in Application No. PCT/CN2021/098696, Mar. 1, 2022, WIPO, 2 pages.

(Continued)

*Primary Examiner* — Walter J Divito
(74) *Attorney, Agent, or Firm* — Volpe Koenig

(57) ABSTRACT

Provided in the present disclosure are a communication method and a communication apparatus. The communication method can be applied to a sender which supports multi-link communication. The method includes: determining a first message frame, where the first message frame includes a multi-link information element, and the multi-link information element includes a first identifier for identifying a support capability of the transmitter for receiving information of parameterized spatial reuse (PSR)-based spatial reuse (SR); and transmitting the first message frame.

16 Claims, 3 Drawing Sheets

(56) References Cited

U.S. PATENT DOCUMENTS

| | | | | |
|---|---|---|---|---|
| 2021/0014911 | A1* | 1/2021 | Patil | H04W 12/73 |
| 2021/0051574 | A1 | 2/2021 | Lou et al. | |
| 2024/0106585 | A1* | 3/2024 | Lou | H04L 5/0023 |
| 2025/0048428 | A1* | 2/2025 | Lou | H04W 74/0816 |

FOREIGN PATENT DOCUMENTS

| | | | | |
|---|---|---|---|---|
| CN | 111788868 | A | * 10/2020 | G03F 7/70191 |
| CN | 112566272 | A | 3/2021 | |
| EP | 4258713 | A1 | 10/2023 | |
| WO | 2021011426 | A1 | 1/2021 | |
| WO | 2021089022 | A1 | 5/2021 | |

OTHER PUBLICATIONS

ISA State Intellectual Property Office of the People's Republic of China, Written Opinion of the International Searching Authority Issued in Application No. PCT/CN2021/098696, Mar. 1, 2022, WIPO, 3 pages.

European Patent Office, Extended European Search Report Issued in Application No. 21944496.5, Feb. 27, 2005, Germany, 10 pages.

Edward AU: "Draft P802.11be_D1.0.pdf", IEEE Draft WGDS;942232876538, IEEE-SA IMeet Central Piscataway, NJ USA,802.11—Editiorial May 24, 2021 XP068255523, 635 pages.

Garcia-Rodrigues Adrian et al: "IEEE 802.11be: Wi-Fi 7 Strikes Back", IEEE Communications Magazine, IEEE Service Center,Piscataway, US, vol. 59, No. 4, May 17, 2021, XP011854908, pp. 102-108.

ISA State Intellectual Property Office of the People's Republic of China, Written Opinion of the International Searching Authority Issued in Application No. PCT/CN2021/098696, Mar. 1, 2022, WIPO, 7 pages.

Chinese Office Action issued on Apr. 30, 2026 for Chinese Patent Application No. 202180001646.X.

Indian Office Action issued on May 4, 2026 for Indian Patent Application No. 202417000574.

* cited by examiner

COMMUNICATION METHODS AND COMMUNICATION APPARATUSES

CROSS REFERENCE TO RELATED APPLICATIONS

This application is a U.S. national phase application of International Application No. PCT/CN2021/098696, filed on Jun. 7, 2021, the disclosure of which is incorporated herein by reference in its entirety for all purposes.

BACKGROUND

The current research scope of Wireless Fidelity (Wi-Fi) technology includes bandwidth transmission of 320 MHz, aggregation and cooperation of a plurality of frequency bands, etc. It is expected to improve the rate and throughput by at least four times compared to existing standards, and main application scenarios include video transmission, augmented reality (AR), virtual reality (VR), etc.

The aggregation and cooperation of the plurality of frequency bands means that communication is performed between devices under frequency bands of 2.4 GHz, 5.8 GHZ, 6-7 GHz at the same time. For communication performed between devices under the plurality of frequency bands at the same time, a new media access control (MAC) mechanism needs to be defined for management. In addition, it is expected that low-latency transmission can be supported by the aggregation and coordination of the plurality of frequency bands.

At present, the maximum bandwidth supported by the aggregation and cooperation of the plurality of frequency bands is 320 MHz (160 MHz+160 MHz). In addition, 240 MHz (160 MHz+80 MHz) and other bandwidths supported by existing standards may also be supported.

In current Wi-Fi technology, multi-link communication can be supported. For example, an access point (AP) and a station (STA) included in a current wireless communication system can be multi-link devices (MLDs), i.e., a function of simultaneously transmitting and/or receiving under multiple links at the same time is supported. Therefore, there can be multiple links between the STA MLD and the AP MLD.

In order to improve throughput of a dense environment, a spatial reuse (SR) mechanism have been introduced, for example, packet detection (PD)-based SR or parameterized spatial reuse (PSR)-based SR. However, the existing SR mechanism only supports single-link applications and is not suitable for the above-mentioned multi-link communication.

SUMMARY

The present disclosure relates to the field of communication, and in particular to communication methods and communication apparatuses.

According to an embodiment of the present disclosure, there is provided a communication method. The communication method can be applied to a transmitter that supports multi-link communication, and can include: determining a first message frame, where the first message frame includes a multi-link information element, and the multi-link information element includes a first identifier for identifying a support capability of the transmitter for receiving information of parameterized spatial reuse (PSR)-based spatial reuse (SR); and transmitting the first message frame.

According to an embodiment of the present disclosure, there is provided a communication method. The communication method can be applied to a receiver that supports multi-link communication, and can include: receiving a first message frame, where the first message frame includes a multi-link information element, and the multi-link information element includes a first identifier for identifying a support capability of a transmitter of the first message frame for receiving information of parameterized spatial reuse (PSR)-based spatial reuse (SR); and performing a communication operation based on the first message frame.

According to an embodiment of the present disclosure, there is provided an electronic device. The electronic device includes a memory, a processor, and a computer program stored in the memory and executable on the processor. The methods described above are implemented when the computer program is executed by the processor.

According to an embodiment of the present disclosure, there is provided a computer readable storage medium storing a computer program. The methods described above are implemented when the computer program is executed by the processor.

BRIEF DESCRIPTION OF THE DRAWINGS

The above and other features of embodiments of the present disclosure will be more apparent by describing in detail exemplary embodiments of the present disclosure with reference to the accompanying drawings, in which.

DETAILED DESCRIPTION OF THE EMBODIMENTS

The following description, with reference to the accompanying drawings, is provided to help achieve a comprehensive understanding of various embodiments of the present disclosure as defined by the appended claims and their equivalents. Various embodiments of the present disclosure include various specific details, which are to be considered as exemplary only. In addition, for clarity and conciseness, descriptions of well-known technologies, functions, and configurations can be omitted.

The terms and words used in the present disclosure are not limited to written meanings, but are only used by the inventor to enable a clear and consistent understanding of the present disclosure. Therefore, for those skilled in the art, the description of various embodiments in the present disclosure is provided for the purpose of illustration only, and not for limitation.

It should be understood that singular forms “a/an”, “one”, “the”, and “said” used herein can also include the plural forms unless the context clearly indicates otherwise. It should be further understood that the term “including” used in the present disclosure refers to the presence of described features, integers, steps, operations, elements, and/or components, but does not exclude the presence or addition of one or more other features, integers, steps, operations, elements, components, and/or groups thereof.

It will be understood that although terms "first", "second", and the like can be used herein to describe various elements, these elements should not be limited by these terms. These terms are only used to distinguish one element from another. Therefore, without departing from the teachings of the exemplary embodiments, the first element discussed below can be referred to as the second element.

It should be understood that when a component is referred to as "connected" or "coupled" to another component, it can be directly connected or coupled to other components, or there can also be intermediate components. In addition, "connected" or "coupled" used herein can include wireless connected or wireless coupled. The term "and/or" or the expression "at least one of . . . " used herein includes any and all combinations of one or more related listed items.

Unless otherwise defined, all terms used herein (including technical terms and scientific terms) have the same meaning as those generally understood by ordinary technicians in the field to which the present disclosure belongs.

Figure 1:
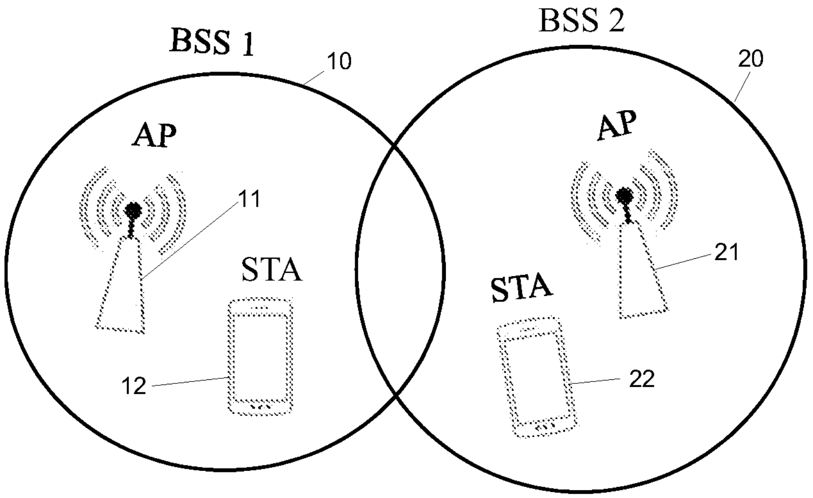
FIG. 1 is an exemplary diagram illustrating a wireless communication scenario.

FIG. 1 is an exemplary diagram illustrating a wireless communication scenario.

A basic service set (BSS) can include an access point (AP) and one or more stations (STAs) that communicate with the AP. A BSS can be connected to a distribution system (DS) through its AP, or can be connected to another BSS to form an extended service set (ESS).

In a wireless communication environment, there can generally be a plurality of BSSs, for example, BSS 1 10 and BSS 2 20 as shown in FIG. 1. Each BSS can include one access point 11, 21 and one or more stations 12, 22. In FIG. 1, for brevity of description, an example of each BSS including one access point and one station is shown. However, it will be understood that the number of the basic service sets and the number of the access points and stations in each basic service set shown in FIG. 1 are only exemplary, and the embodiments of the present disclosure are not limited to this.

The AP is a wireless switch used in a wireless network and is also a core of the wireless network. The AP device can be used as a wireless base station, which is mainly used as a bridge to connect a wireless network and a wired network. With this AP device, wired and wireless networks can be integrated.

The AP can include software applications and/or circuits so that other types of nodes in the wireless network can communicate with the outside and inside of the wireless network through the AP. In some examples, the AP can be a terminal device or a network device equipped with a wireless fidelity (Wi-Fi) chip, for example.

As an example, a station (STA) can include, but is not limited to, a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

In an exemplary embodiment of the present disclosure, the AP and the STA in each BSS can be devices that support multiple links, for example, they can be represented as an AP multi-link device (MLD) and a non-AP STA MLD, respectively. As an example only, the AP MLD can represent an access point that supports multi-link communication function, and the non-AP STA MLD can represent a station that supports multi-link communication function. In this case, the AP and the STA in BSS 1 and BSS 2 shown in FIG. 1 can be represented as the AP MLD and the non-AP STA MLD, respectively, which can communicate under multiple links. For convenience of description, in each BSS shown in FIG. 1, an example of communication between one AP MLD and one non-AP STA MLD under multiple links is mainly shown. However, the exemplary embodiments of the present disclosure are not limited to this.

Figure 2:
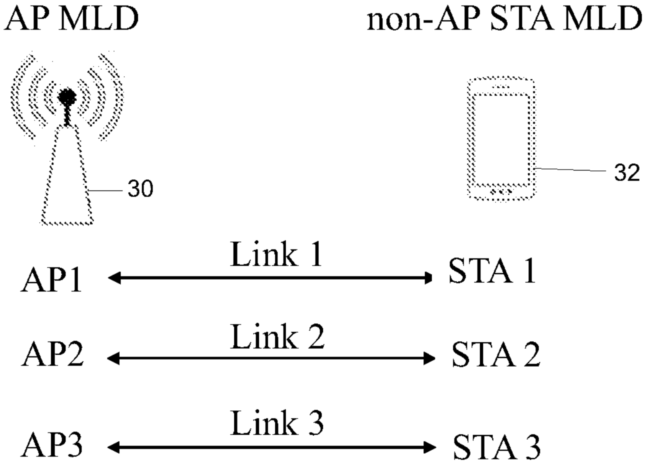
FIG. 2 is an exemplary diagram illustrating a multi-link communication.

FIG. 2 shows a specific example of communication between the AP MLD 30 and the non-AP STA MLD 32 under multiple links (for example, Link 1 to Link 3). Referring to FIG. 2, the AP MLD can work under three links, for example, AP1, AP2, and AP3 as shown in FIG. 2, and the non-AP STA MLD can also work under three links, for example, STA1, STA2, and STA3 as shown in FIG. 2. In the example in FIG. 2, it is assumed that AP1 and STA1 communicate through a corresponding first link, Link 1. Similarly, AP2 and AP3 communicate with STA2 and STA3 through a second link, Link 2, and a third link, Link 3, respectively. In addition, Link 1 to Link 3 can be multiple links at different frequencies, for example, links at 2.4 GHz, 5 GHZ, 6 GHZ, or several links with the same or different bandwidths at 2.4 GHz, 5 GHZ, 6 GHZ. In addition, a plurality of channels can exist under each link. However, it should be understood that the communication scenario shown in FIG. 2 is only exemplary, and the concept of the present disclosure is not limited to this. For example, an AP MLD can be connected to a plurality of non-AP STA MLDs, or an AP can communicate with a plurality of other types of stations under each link.

When access points in a plurality of basic service sets are densely arranged in a wireless communication environment, there may be an overlap in the coverage range between the basic service sets (for example, overlapping basic service set (OBSS)), resulting in communication interference. Therefore, spatial reuse (SR) technology is introduced to improve communication efficiency and spectrum utilization.

The existing spatial reuse technology is only applicable to an environment where there is a single link between the AP and the STA. In order to be applicable to the aforementioned multi-link communication, the embodiments of the disclosure provide communication methods and communication apparatuses described below.

Figure 3:
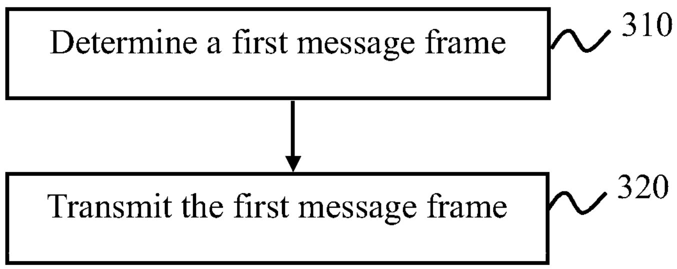
FIG. 3 is a flowchart illustrating a communication method according to an embodiment.

FIG. 3 is a flowchart illustrating a communication method according to an embodiment. The communication method shown in FIG. 3 can be applied to a transmitter that supports multi-link communication (hereinafter referred to as "transmitter"). For example, the transmitter can be an access point that supports multi-link communication or a station that supports multi-link communication. Correspondingly, a receiver can be a station that supports multi-link communication or an access point that supports multi-link communication.

Referring to FIG. 3, in step 310, a first message frame can be determined. According to an example of the present disclosure, the first message frame may be a frame in the process of setting up multiple links between the transmitter and the receiver. For example, when the transmitter is an access point that supports multi-link communication, the first message frame may be a beacon frame, a (multi-link) probe response frame, an association response frame or a re-association response frame. When the transmitter is a station that supports multi-link communication, the first message frame can be a (multi-association) probe request frame, an association request frame, or a re-association request frame ((re-) multi-link setup message frame). However, it will be understood that the examples of the first message frame described herein are only illustrative and not a limitation of the present disclosure.

In an example of the present disclosure, there are many ways to determine the first message frame. For example, the transmitter can generate the first message frame based on at least one of the following conditions: network condition, load condition, hardware capability of the transmitting/receiving device, service type, and relevant protocol provisions. There are no specific restrictions on this in the embodiments of the present disclosure. In an example of the present disclosure, the transmitter can also obtain the first message frame from an external device, and there are no specific restrictions on this in the embodiments of the present disclosure.

According to an example of the present disclosure, the transmitter and the receiver can identify supported capability information values in the initial association process (multi-link setup process). Therefore, the first message frame can carry various information, including capability information. For example, the first message frame may include various information elements.

In an example of the present disclosure, the first message frame may carry spatial reuse capability information of the transmitter. For example, the first message frame may include a first identifier for identifying a support capability of the transmitter for receiving information of parameterized spatial reuse (PSR)-based spatial reuse (SR) (for example, the first identifier may be denoted as "PSR Responder"); and/or, the first message frame may include a second identifier for identifying a support capability of the transmitter for transmitting the information of the PSR-based SR (for example, the second identifier may be denoted as "PSR-based SR Support"). According to an example of the present disclosure, the first identifier and the second identifier can be included in the same element or different information elements of the first message frame, which will be described in detail below.

In an example of the present disclosure, the first identifier and the second identifier can be included in the same information element of the first message frame. For example, the first message frame can include a multi-link (ML) information element, and both the first identifier and second identifier can be included in the multi-link information element. The first identifier and second identifier are included in the same information element of the first message frame, so that the spatial reuse capability information of the transmitter can be transmitted in a simple encoding and decoding manner. In addition, it will be understood that the embodiments herein are only descriptive and not restrictive to the present disclosure. For example, the first identifier and the second identifier may also be included in an element other than the multi-link information element. For example, the first identifier and the second identifier may be included in an extremely high throughput (EHT) media access control (MAC) capability information element.

According to an embodiment of the present disclosure, both the first identifier and the second identifier can be included in a control field of the multi-link information element, as shown in Table 1 below.

TABLE 1

| multi-link control field | | | | |
|---|---|---|---|---|
| Type | MLD MAC Address Present | PSR Responder | PSR-based SR Support | Reserved |

According to another example of the present disclosure, both the first identifier and the second identifier can be included in a common information (Info) field of the multi-link information element, as shown in Table 2 below. In this case, the multi-link information element can have a format of a basic variant multi-link element.

TABLE 1

| common Info field | | | |
|---|---|---|---|
| MLD MAC Address | PSR Responder | PSR-based SR Support | Reserved |

It can be understood that respective contents in Table 1 or 2 exists independently, and these contents are exemplarily listed in the same table, but it does not mean that all the contents in the table must exist simultaneously as shown in the table. The value of each content is independent of any other content in Table 1 or 2. Therefore, those skilled in the art can understand that the value of each content in Table 1 or Table 2 is an independent embodiment.

Referring to Tables 1 and 2, when the first identifier (PSR Responder) is set to a specific value (for example, but not limited to, "1"), it can be identified that the receiver supports receiving information of PSR-based SR, for example, PSR based parameterized spatial reuse transmission (PSRT) physical protocol data unit (PPDU). In other words, the receiver can receive information as the responder (i.e., the receiver) in the PSR-based SR operation. When the first identifier (PSR Responder) is set to another specific value (for example, but not limited to, "0"), it can be identified that the transmitter does not support receiving, for example, PSR based PSRT PPDU.

Similarly, when the second identifier (PSR-based SR Support) is set to a specific value (for example, but not limited to, "1"), it can be identified that the receiver supports transmitting information of PSR-based SR, for example, PSR based PSRT PPDU. In other words, the receiver can transmit information as a transmitter in the PSR-based SR operation. When the second identifier (PSR-based SR Support) is set to another specific value (for example, but not limited to, "0"), it can be identified that the transmitter does not support transmitting, for example, PSR based PSRT PPDU.

In embodiments where the first identifier (PSR Responder) and the second identifier (PSR-based SR Support) are carried in the manner shown in Tables 1 and 2, the first identifier and the second identifier can be MLD-level. In other words, the first identifier and/or the second identifier are carried in the control field or the common Info field of the multi-link information element of the first message frame, the support capability identified by the first identifier (PSR Responder) and the support capability identified by the second identifier (PSR-based SR Support) can be applied to multiple links supported by the transmitter. That is, when the first identifier and the second identifier are set to "1", for example, it can be identified that both receiving information of PSR-based SR and transmitting information of PSR-based SR are supported under multiple links of the transmitter.

Carrying the first identifier (PSR Responder) and the second identifier (PSR-based SR Support) in an MLD-level manner can simplify the amount of information in the multi-link information element and reduce power consumption in information transmission.

According to another embodiment of the present disclosure, the first identifier (PSR Responder) and the second identifier (PSR-based SR Support) can be link-level. That is, the spatial reuse capability information of each of the multiple links supported by the transmitter can be identified in the first message frame, respectively. In this case, the first identifier and/or the second identifier can be included in a per-STA profile field of the multi-link information element. More specifically, the first identifier and/or the second identifier can be included in a STA control field of the per-STA profile field. For example, the first identifier and the second identifier at the link-level can be represented by the STA control field in the per-STA profile x shown in FIG. 4.

Figure 4:
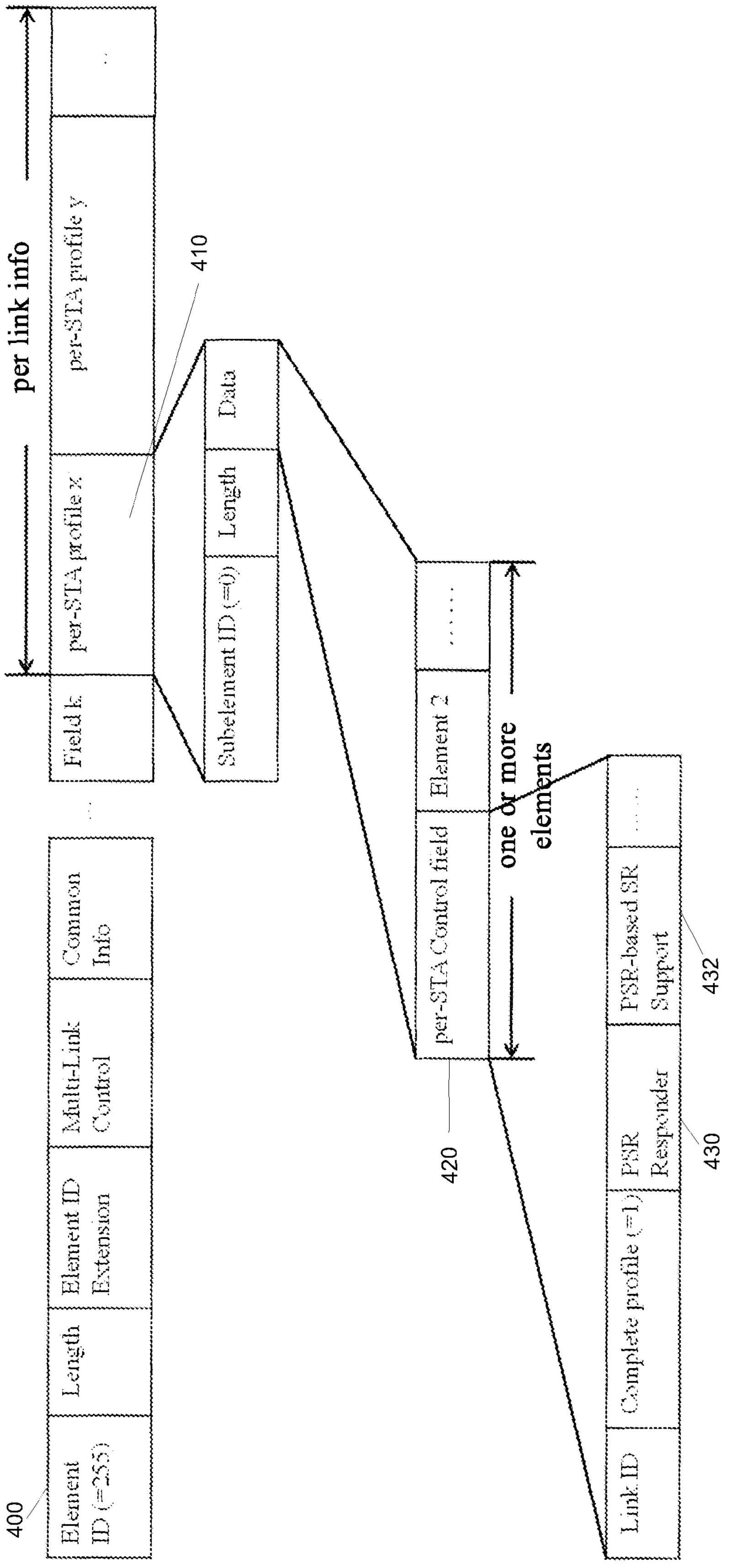
FIG. 4 is an exemplary format illustrating a multi-link information element.

Referring to FIG. 4, the multi-link information element 400 may include an element ID field, a length field, an element ID extension field, a control field, a common Info field, a per link info field, etc. It will be understood that the various fields included in the multi-link information element are only illustrative examples and not a limitation of the present disclosure. For example, some fields in FIG. 4 may be omitted, or other fields may be added.

In FIG. 4, the per-STA profile x 410 can correspond to the per-STA profile field. Specifically, the first identifier (PSR Responder) 430 and second identifier (PSR-based SR Support) 432 can be carried in the STA control field 420 of the per-STA profile x 410. Since the first identifier (PSR Responder) and the second identifier (PSR-based SR Support) are link-level, a link identifier (Link ID) corresponding to a link that supports the spatial reuse capability can also be carried to identify spatial reuse capability information of the link corresponding to the link identifier (Link ID). According to an embodiment of the present disclosure, the link identifier (Link ID) can identify combined information of working spectrum, bandwidth/channel, and basis service set identifier (BSSID). In addition, it can be understood that when the transmitter is an AP MLD, STAs in FIG. 4 can correspond to affiliated access points under the AP MLD (for example, AP1 to AP3 as shown in FIG. 2). When the transmitter is a non-AP STA MLD, the STAs in FIG. 4 can correspond to affiliated stations under the non-AP STA MLD (for example, STA1 to STA3 in FIG. 4). Although only the specific format of one per-STA profile field is shown in FIG. 4, it can be understood that the multi-link information element in FIG. 4 can include multiple per-STA profile fields respectively corresponding to multiple links (multiple STAs) supported by the transmitter.

For a link in multiple links, values of the first identifier and the second identifier carried in the per-STA profile field can be set with reference to the embodiments described in Table 1 and Table 2 above. For simplicity, repeated descriptions are omitted herein.

Carrying the first identifier (PSR Responder) and the second identifier (PSR-based SR Support) in a link-level manner can define spatial reuse capability information for any link or each link in multiple links, thus increasing the flexibility and applicability of the system.

In an embodiment of the present disclosure, the first identifier and the second identifier can be included in different information elements of the first message frame. For example, the first message frame may include an EHT physical (PHY) capability information element. As an example, the first identifier (PSR Responder) can be included in the multi-link information element as shown in Table 1, Table 2, or FIG. 4 above, and the second identifier (PSR-based SR Support) can be included in the EHT PHY capability information element. Or, as another example, the first identifier (PSR Responder) can be included in an EHT MAC capability information element, and the second identifier (PSR-based SR Support) can be included in the EHT PHY capability information element. It will be understood that the examples of including the first identifier and the second identifier in different information elements described herein are only illustrative and not a limitation of the present disclosure. The values of the first identifier and the second identifier can be set according to the embodiments described in Tables 1 and 2 above, and repeated descriptions are omitted herein for simplicity. According to an embodiment in the present disclosure, the second identifier can be omitted from Table 1, Table 2, or FIG. 4. The manner of carrying the second identifier in the EHT PHY capability information element can be compatible with existing standards (for example, compatible with high-efficiency (HE) wireless communication).

In addition, it will be understood that the embodiments herein are only descriptive and not a limitation of the present disclosure. For example, the second identifier can also be included in an element other than the EHT PHY capability information element. For another example, the first identifier can be omitted from Table 1, Table 2, or FIG. 4, and the first identifier can be carried in the EHT PHY capability information element.

Referring back to FIG. 3, in step S320, the first message frame can be transmitted. According to an example, the transmitter can transmit the first message frame under any of multiple links it supports, and in the initial association process (the multi-link setup process), inform the receiver of the spatial reuse capability information of each link through the information carried in the first message frame.

It will be understood that the communication method shown in FIG. 3 is only exemplary, and the present disclosure is not limited to this. For example, the communication method according to an exemplary embodiment of the present disclosure may further include: receiving another message frame from the receiver, which carries spatial reuse capability information about respective links of the receiver. The spatial reuse capability information of the receiver can be carried similarly to the embodiment in step S310 above, and repeated descriptions are omitted herein to avoid redundancy.

In addition, in the case where the transmitter is an access point that supports multi-link communication, the communication method according to an exemplary embodiment of the present disclosure may further include: transmitting a second message frame, where the second message frame includes information on a spatial reuse (SR) parameter set, for example, a SR parameter set element. According to an embodiment, the second message frame may be, for example, but not limited to, a beacon frame, an association response frame, a probe response frame, etc. The information on the SR parameter set can provide various information required by the STA in the spatial reuse operation, for example, element ID, length, SR Control, spatial reuse group (SRG) OBSS packet detection (PD) min offset, SRG OBSS PD max offset, SRG BSS color bitmap, SRG partial BSSID bitmap, etc.

According to an embodiment of the present disclosure, the second message frame may be a different frame from the first message frame. For example, in the case where the transmitter is an AP MLD, the first message frame can be a beacon frame transmitted by the transmitter (carrying the first identifier and the second identifier), and the second message frame can be an association response frame transmitted by the transmitter (carrying information on the SR parameter set). For another example, the first message frame can be an association request frame transmitted by the AP STA MLD (carrying the first identifier and the second identifier), and the second message frame can be an association response frame transmitted by the AP MLD (carrying information on the SR parameter set). Or, the second message frame can be transmitted at a different time period (during multi-link communication process) from the time period during which the first message frame is transmitted (during multi-link setup process).

According to another embodiment of the present disclosure, the second message frame may be the same frame as the first message frame. For example, during the multi-link setup process, the first message frame (for example, beacon frame) transmitted by the transmitter (for example, AP MLD) can carry information on the SR parameter set in addition to the first and second identifiers.

In an embodiment of the present disclosure, the second message frame can include a multi-link information element, and the information on the SR parameter set may be included in the multi-link information element. For example, the information on the SR parameter set can be included in a control information field, a common information field, or a per-STA profile field of the multi-link information element.

According to an embodiment of the present disclosure, in the case where the first identifier (PSR Responder) and second identifier (PSR-based SR Support) are MLD-level, the information on the SR parameter set can be included in the control information field or common information field of the multi-link information element of the second message frame.

According to another embodiment of the present disclosure, in the case where the first identifier (PSR Responder) and the second identifier (PSR-based SR Support) are link-level, the information on the SR parameter set can be included in the per-STA profile field of the multi-link information element of the second message frame, for example, under a 6 GHz spectrum link. In this case, the second message frame can include a link identifier (Link ID) corresponding to the corresponding link, which can be similar to the Link ID in FIG. 3.

In another embodiment of the present disclosure, the second message frame can include a reduced neighbor report element (RNRE), and the information on the SR parameter set can be included in the RNRE. In this embodiment, the first identifier (PSR Responder) and the second identifier (PSR-based SR Support) can be link-level. As an example, the RNRE can also include, but is not limited to, a MLD parameter subfield, which includes information such as an identifier of the MLD and a link identifier corresponding to each link under the MLD. Therefore, the information on the SR parameter set and the link identifier can together indicate information required to perform spatial reuse under the corresponding link.

In another embodiment of the present disclosure, an order of the information on the SR parameter set in the second message frame is set to be compatible with high-efficiency (HE) wireless communication. For example, the order (position) of information on the SR parameter set in the second message frame can be set to be the same as the order of the spatial reuse parameter set in the high-efficiency (HE) wireless communication, thereby achieving compatibility with the high-efficiency (HE) wireless communication. In other words, the information on the SR parameter set carried in the second message frame can be parsed by a station supporting HE wireless communication.

According to an embodiment of the present disclosure, the AP MLD can carry a spatial reuse parameter set for broadcasting, for example, in a beacon frame. Specifically, in the case of the MLD-level, if the first identifier (PSR Responder) and the second identifier (PSR-based SR Support) are set to "1", it is identified that a PSR-based SR mechanism is supported, and the spatial reuse parameter set is included in the common Info field. In the case of the link-level, the first identifier (PSR Responder) and the second identifier (PSR-based SR Support) bits are included under each link, and the spatial reuse parameter set is included in the per-STA profile field or the RNRE. Or, in order to be compatible with HE wireless communication, the spatial reuse parameter set can be included in the same order field. For example, but not limited to, in a beacon frame, the order of the spatial reuse parameter set can be 82; in an association response frame, the order of the spatial reuse parameter set can be 60; in a probe response frame, the order of the spatial reuse parameter set can be 98.

Figure 5:
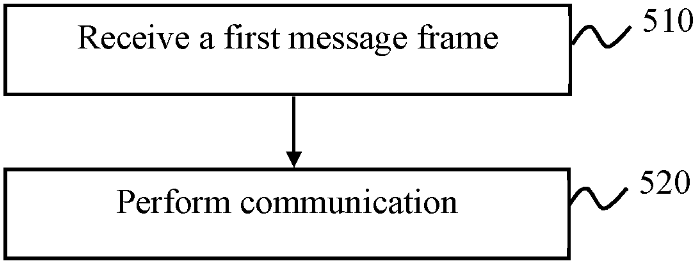
FIG. 5 is a flowchart illustrating another communication method according to an embodiment.

FIG. 5 is a flowchart illustrating another communication method according to an embodiment. The communication method shown in FIG. 5 can be applied to a receiver that supports multi-link communication. For example, when the transmitter performing the communication method shown in FIG. 3 is an access point that supports multi-link communication, the receiver is a station that supports multi-link communication. When the transmitter is a station that supports multi-link communication, the receiver is an access point that supports multi-link communication.

Referring to FIG. 5, in step 510, a first message frame is received, where the first message frame includes a multi-link information element, and the multi-link information element includes a first identifier for identifying a support capability of a transmitter of the first message frame for receiving information of parameterized spatial reuse (PSR)-based spatial reuse (SR). According to an embodiment of the present disclosure, the multi-link information element may further include a second identifier for identifying a support capability of the transmitter for transmitting the information of the PSR-based SR. According to an embodiment of the present disclosure, the first identifier and/or the second identifier are included in a control field or a common information field of the multi-link information element. In this case, the first identifier and the second identifier can be MLD-level. According to an embodiment of the present disclosure, the first identifier and/or the second identifier are included in a per-STA profile field of the multi-link information element. In this case, the first identifier and the second identifier can be link-level. According to an embodiment of the present disclosure, the first message frame can include an extremely high throughput physical (PHY) capability information element. In this case, the extremely high throughput PHY capability information element can include a second identifier for identifying a support capability of the transmitter for transmitting the information of the PSR-based SR.

In step 520, a communication operation is performed based on the first message frame. For example, the receiver can obtain spatial reuse capability information of the transmitter from the first message frame to determine whether to use the spatial reuse mechanism for communication in the subsequent communication operation.

The communication method shown in FIG. 5 is only exemplary and not a limitation of the present disclosure.

For example, in the case where the receiver is a station that supports multi-link communication, the communication method shown in FIG. 5 may further include: receiving a second message frame, where the second message frame includes information on a SR parameter set. According to an embodiment of the present disclosure, the second message frame can include a multi-link information element, where the information on the SR parameter set is included in a control information field, a common information field, or a per-STA profile field of the multi-link information element. According to an embodiment of the present disclosure, the second message frame can include a reduced neighbor report element (RNRE), where the information on the SR parameter set is included in the RNRE. According to an embodiment of the present disclosure, an order of the information on the SR parameter set in the second message frame can be set to be compatible with high-efficiency wireless communication.

It can be understood that the first message frame, the first identifier, the second identifier, the second message frame, the information on the SR parameter set, the order, etc., referred to in FIG. 5 can be similar to the embodiment described with reference to FIG. 3. For simplicity, repeated descriptions are omitted herein.

According to the communication methods described in FIGS. 3 and 5, the spatial reuse mechanism can be applied under multiple links, which improves spectrum utilization efficiency and system throughput.

Figure 6:
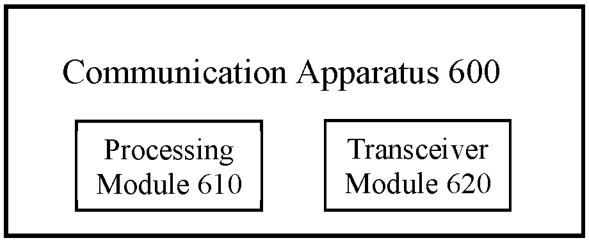
FIG. 6 is a block diagram illustrating a communication apparatus according to an embodiment.

FIG. 6 is a block diagram illustrating a communication apparatus according to an embodiment. The communication apparatus 600 may include a processing module 610 and a transceiver module 620. The communication apparatus shown in FIG. 6 can be applied to a transmitter or a receiver that supports multi-link communication.

In the case where the communication apparatus 600 shown in FIG. 6 is applied to a transmitter supporting multi-link communication, the processing module 610 can be configured to determine a first message frame, where the first message frame includes a multi-link information element, and the multi-link information element includes a first identifier for identifying a support capability of the transmitter for receiving information of parameterized spatial reuse (PSR)-based spatial reuse (SR). The transceiver module 620 can be configured to transmit the first message frame. That is, in this case, the communication apparatus 600 shown in FIG. 6 can perform the communication method described with reference to FIG. 3. For simplicity, repeated descriptions are omitted herein.

In the case where the communication apparatus 600 shown in FIG. 6 is applied to a receiver that supports multi-link communication, the transceiver module 620 can be configured to receive a first message frame, where the first message frame includes a multi-link information element, and the multi-link information element includes a first identifier for identifying a support capability of a transmitter of the first message frame for receiving information of parameterized spatial reuse (PSR)-based spatial reuse (SR). The processing module 610 is configured to perform a communication operation based on the first message frame. That is, in this case, the communication apparatus 600 can perform the communication method described with reference to FIG. 5. For simplicity, repeated descriptions are omitted herein.

It will be understood that the communication apparatus 600 shown in FIG. 6 is only exemplary, and the embodiments of the present disclosure are not limited to this. For example, the communication apparatus 600 may also include other modules, for example, a memory module, etc. In addition, the various modules in the communication apparatus 600 can be combined into more complex modules or divided into more individual modules.

The communication methods described with reference to FIGS. 3 and 5, and the communication apparatus described with reference to FIG. 6 can apply the spatial reuse mechanism under multiple links, improve spectrum utilization efficiency, and system throughput.

Based on the same principle as the methods provided in the embodiments of the present disclosure, the embodiments of the present disclosure also provides an electronic device, which includes a processor and a memory. The memory stores machine readable instructions (also known as "a computer program"). The processor is configured to execute the machine readable instructions to implement the methods described with reference to FIGS. 3 and 5.

An embodiment of the present disclosure also provides a computer readable storage medium, on which a computer program is stored. When the computer program is executed by a processor, the methods described with reference to FIGS. 3 and 5 are implemented.

In an exemplary embodiment, the processor may be logic blocks, modules and circuits for implementing or performing various examples described in the present disclosure, for example, a central processing unit (CPU), a general-purpose processor, a digital signal processor (DSP), an application specific integrated circuit (ASIC), a field programmable gate array (FPGA) or other programmable logic devices, transistor logic devices, hardware components or any combination thereof. The processor can also be a combination that realizes computing functions, for example, a combination of one or more microprocessors, a combination of DSP and microprocessors, etc.

In an exemplary embodiment, the memory can be, for example, a read only memory (ROM), a random access memory (RAM), an electrically erasable programmable read only memory (EEPROM), a compact disc read only memory (CD-ROM), or other optical disc storage, optical disk storage (including compact disk, laser disk, optical disk, digital versatile disk, Blu-ray disk, etc.), a magnetic disc storage medium or other magnetic storage device, or any other medium that can be used to carry or store program codes in the form of instructions or data structures and can be accessed by a computer, but is not limited to this.

It is to be understood that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequence. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of the sub-steps or stages of the other steps.

Although the present disclosure has been shown and described with reference to certain embodiments thereof, it will be understood by those skilled in the art that various changes in form and details can be made without departing from the scope of the present disclosure. Therefore, the scope of the present disclosure should not be limited to the embodiments, but should be defined by the appended claims and their equivalents.

The invention claimed is:

1. A communication method, performed by a transmitter that supports multi-link communication, wherein the transmitter is an access point that supports the multi-link communication, and the communication method comprises:

determining a first message frame, wherein the first message frame is a frame in a process of setting up multiple links between the transmitter and a receiver, the first message frame comprises a multi-link information element, and the multi-link information element comprises a first identifier for identifying a support capability of the transmitter for receiving information of parameterized spatial reuse (PSR)-based spatial reuse (SR); and transmitting the first message frame;

wherein the communication method further comprises:

transmitting a second message frame, wherein the second message frame comprises information on a SR parameter set;

wherein an order of the information on the SR parameter set in the second message frame is set to be compatible with high-efficiency wireless communication by being set to be the same as an order of a spatial reuse parameter set in the high-efficiency wireless communication.

2. The communication method according to claim 1, wherein the multi-link information element further comprises a second identifier for identifying a support capability of the transmitter for transmitting the information of the PSR-based SR.

3. The communication method according to claim 2, wherein at least one of the first identifier and the second identifier is comprised in a control field or a common information field of the multi-link information element; or at least one of the first identifier and the second identifier is comprised in a per-STA profile field of the multi-link information element.

4. The communication method according to claim 1, wherein the first message frame comprises an extremely high throughput physical (PHY) capability information element;

wherein the extremely high throughput PHY capability information element comprises a second identifier for identifying a support capability of the transmitter for transmitting the information of the PSR-based SR.

5. The communication method according to claim 1, wherein the second message frame comprises a multi-link information element;

wherein the information on the SR parameter set is comprised in a control information field, a common information field, or a per-STA profile field of the multi-link information element.

6. The communication method according to claim 1, wherein the second message frame comprises a reduced neighbor report element (RNRE);

wherein the information on the SR parameter set is comprised in the RNRE.

7. A communication method, performed by a receiver that supports multi-link communication, wherein the receiver is a station (STA) that supports the multi-link communication, and the communication method comprises-comprising:

receiving a first message frame, wherein the first message frame is a frame in a process of setting up multiple links between a transmitter of the first message frame and the receiver, the first message frame comprises a multi-link information element, and the multi-link information element comprises a first identifier for identifying a support capability of the transmitter for receiving information of parameterized spatial reuse (PSR)-based spatial reuse (SR); and performing a communication operation based on the first message frame;

wherein the communication method further comprises:

receiving a second message frame, wherein the second message frame comprises information on a SR parameter set;

wherein an order of the information on the SR parameter set in the second message frame is set to be compatible with high-efficiency wireless communication by being set to be the same as an order of a spatial reuse parameter set in the high-efficiency wireless communication.

8. The communication method according to claim 7, wherein the multi-link information element further comprises a second identifier for identifying a support capability of the transmitter for transmitting the information of the PSR-based SR.

9. The communication method according to claim 8, wherein at least one of the first identifier and the second identifier is comprised in a control field or a common information field of the multi-link information element; or at least one of the first identifier and the second identifier is comprised in a per-STA profile field of the multi-link information element.

10. The communication method according to claim 7, wherein the first message frame comprises an extremely high throughput physical (PHY) capability information element;

wherein the extremely high throughput PHY capability information element comprises a second identifier for identifying a support capability of the transmitter for transmitting the information of the PSR-based SR.

11. The communication method according to claim 7, wherein the second message frame comprises a multi-link information element;

wherein the information on the SR parameter set is comprised in a control information field, a common information field, or a per-STA profile field of the multi-link information element.

12. The communication method according to claim 7, wherein the second message frame comprises a reduced neighbor report element (RNRE);

wherein the information on the SR parameter set is comprised in the RNRE.

13. An electronic device, comprising a memory, a processor, and a computer program stored in the memory and executable on the processor, wherein the electronic device is an access point that supports multi-link communication, and the processor is configured to execute the computer program to perform operations comprising:

determining a first message frame, wherein the first message frame is a frame in a process of setting up multiple links between the electronic device and a receiver, the first message frame comprises a multi-link information element, and the multi-link information element comprises a first identifier for identifying a support capability of the electronic device for receiving information of parameterized spatial reuse (PSR)-based spatial reuse (SR); and transmitting the first message frame;

wherein the processor is further configured to execute the computer program to:

transmit a second message frame, wherein the second message frame comprises information on a SR parameter set;

wherein an order of the information on the SR parameter set in the second message frame is set to be compatible with high-efficiency wireless communication by being set to be the same as an order of a spatial reuse parameter set in the high-efficiency wireless communication.

14. An electronic device, comprising a memory, a processor, and a computer program stored in the memory and executable on the processor, wherein the processor is configured to execute the computer program to perform the communication method according to claim 7.

15. A non-transitory computer readable storage medium storing a computer program, wherein the communication method according to claim 1 is implemented when the computer program is executed by a processor.

16. A non-transitory computer readable storage medium storing a computer program, wherein the communication method according to claim 7 is implemented when the computer program is executed by a processor.

* * * * *